United States Patent Office 3,528,785
Patented Sept. 15, 1970

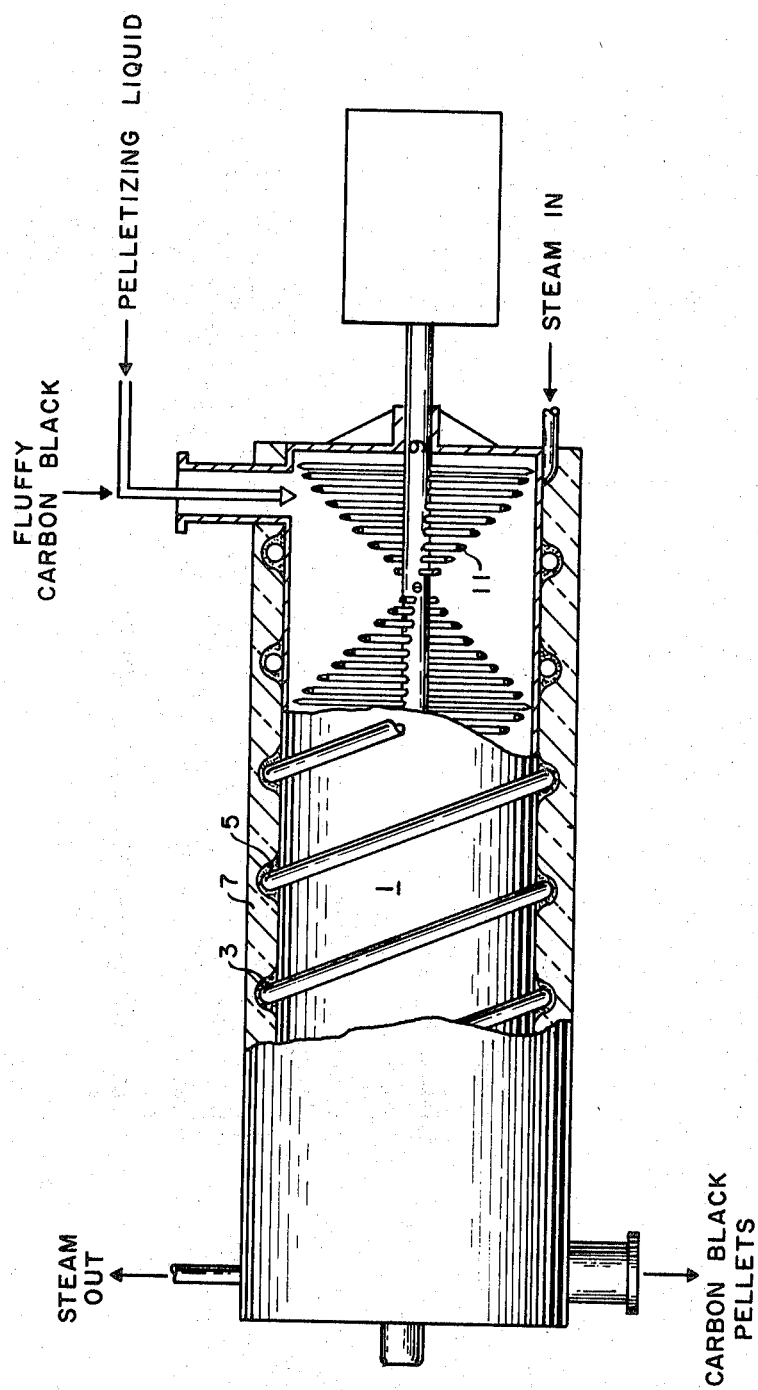

3,528,785
CARBON BLACK PELLETIZATION INCLUDING HEATED BOUNDARY WALL
George W. Dingus, Pampa, Tex., assignor to Cabot Corporation, Boston, Mass., a corporation of Delaware
Filed Feb. 3, 1969, Ser. No. 796,146
Int. Cl. C09c 1/58
U.S. Cl. 23—314                                  1 Claim

ABSTRACT OF THE DISCLOSURE

The invention provides a process and apparatus for producing pellets of carbon black and other finely divided materials by agitation in the wetted state without deposition of cake on the interior wall of the pelletizer. This result is accomplished by external heating of the pelletizer shell during agitation.

---

This invention relates to the art of wet pelletizing pulverulent materials, notably carbon black, and more particularly to a process in which caking of the materials on the walls of the pelletizer with consequent obstruction of the pelletizing zone is minimized and even eliminated entirely. Apparatus for carryng out this process is included within the scope of this invention.

The conversion of dusty, pulverulent materials into beads or pellets of increased density, cohesive strength and nondusting characteristics has been practiced in various arts and particularly in the carbon black art for several decades. Among the earliest U.S. patents pertaining to this art are those of Heller & Snow, Nos. 2,131,686 and 2,306,698.

As described in those and in a plethora of subsequently issued patents such materials, principally carbon black which is the prime beneficiary of such processes, is wetted, usually with an equal amount by weight of water, and agitated by stirring in an elongated trough or tube. The stirring means are metal pins secured helically along a metal shaft mounted for horizontal rotation in the axis of the trough.

Finely divided, powdery materials and particularly carbon black becomes very viscous and sticky when wet and compaction causes adhesion not only of particle to particle but also of particles to other surfaces, notably the walls of the trough. In fact, a heavy cake builds up almost immediately after start-up of the process which cake would soon completely obstruct the flow of the black through the trough but for the scraping action of the rotating pins. Obviously, the resistance of the wall cake consumes additional power to rotate the pin shaft. Additionally, chunks of cake occasionally break away from the mass, momentarily reducing resistance to rotation and at other times especially thick accretions of cake impose exceptionally heavy loads on the drive, both causing uneven surgese in operation. The continuous deposition of wet powder on the walls and its continuous removal by the pin tips often sets up severe vibration in the pins and shaft with accompanying high stresses which frequently cause pins, and sometimes shaft, to break. These spells of "shuddering" consume exceptionally large quantites of power.

Although wet pelletization has been carried out commercially for more than thirty years no successful means have heretofore to my knowledge been devised to eliminate formation of wall cake in wet pelletizers. Accordingly, it is the principal object of my invention to provide such means.

It is a further object of my invention to provide a novel process for carrying out wet pelletization in which cake is inhibited from becoming established on the walls of the pelletizer.

It is another object of this invention to provide apparatus for eliminating the deposition of cake on the pelletizer walls.

The objects of this invention are accomplished by heating the walls of the pelletizer to a temperature sufficiently high that the material being pelleted is prevented from adhering to the wall in any appreciable quantity for any appreciable period of time.

The means by which such heating is accomplished are not critical in the sense that any system for applying and maintaining the heat at a reasonably uniform level will suffice. Thus, steam tracing or electrical heating elements secured to the pelletizer wall will serve the purpose. However, such means are either difficult to attach to the pelletizer or expensive to operate and hence my preferred apparatus is a water jacket. Ordinarily, caking is satisfactorily inhibited at hot water temperature and, in fact, a consistent temperature as low as about 150° F. is satisfactory. Preferably, the temperature will be maintained in the range between about 160–190° F. although there appears to be no upper limit except that the temperature should be held below the degradation temperature of the product. Such degradation temperature is never attained when hot water is used and, in any event, there is no advantage obtained from raising temperature above that obtained with hot water.

It is, of course, desirable that the water jacket enclose the entire area of the trough up to the level of the bed of material being pelleted, i.e., up to the level at which cake is customarily otherwise deposited. Although it is not essential that the jacket run the full length of the trough, it is advantageously installed over the full length of the pelletizer to ensure trouble free operation throughout.

The invention will be further described and illustrated with reference to the accompanying drawing wherein there is shown diagrammatically a wet pelletizer suitable for carrying out the process of the present invention. More complete reference to the wet pelletizer is made as follows.

In the following examples, operations of a conventional wet pelletizer with and without utilization of my invention are compared. The pelletizer employed in the operation described in Example 1 consisted of a horizontal cylindrical tube 1, 30 ins. in diameter and 8 ft. in length. The axial shaft 9 was equipped with a total of 250 pins 11 spaced apart by a distance of ¾ in. and deployed in two helices along the length of the shaft which was rotated at 390 r.p.m. All of the pins were initially bevelled to a chisel point, the edge of the point being in a plane perpendicular to the axis of the shaft.

EXAMPLE 1

A newly equipped pelletizer operating at a throughput rate of 2100 lbs. of high-structure HAF carbon black and 2100 lbs. of pelletizing water per hour at ambient temperature developed the usual wall cake almost immediately after start-up. At the end of six weeks' continuous operation the load on the 40 horsepower drive motor became so great that the circuit breaker began kicking out regularly. Furthermore, the pins near the inlet end were worn down half an inch and below the bevelled part. At this point operation was stopped, the pelletizer was cleaned out and all of the worn pins were resharpened. When the cleaned apparatus was restarted the motor load was 28 amperes (15.7 H.P.) and during three days of continuous operation cake built up and the load increased to 44 amperes (33.2 H.P.).

At this point steam heat was applied to the exterior of the cylindrical tube 1 through a serpentine 3 of approximately 100 ft. of copper tubing bonded to the shell with conductive cement 5 and covered with insulation 7. Within about one hour of heated operation the motor load had dropped to 28 amperes (17 H.P.) and the cake had largely disintegrated.

After nineteen weeks of such operation inspection of the pelletizer showed that very little pin wear had occurred, less than 1/8" on the leading edge and less than 1/16" on the trailing edge of the pin, which was to be expected from unavoidable abrasion in a loose bed of carbon black. The wall of the trough remained substantially free from cake.

Steam consumption during this run amounted to 60 lbs. per hour under a pressure of 109 p.s.i.g.

EXAMPLE 2

Another pelletizer as above described but only 20 inches in diameter was fitted with a one-half inch annular jacket encompassing the entire area of the tubular housing. The jacket was made of 16 gauge type 304 stainless steel and was equipped with baffles to provide good distribution of flowing water. The apparatus was first operated without application of heat during which time cake built up in the usual manner. The 20 H.P. drive motor was then drawing 15 to 20 amperes (12 to 16 H.P.) and the usual frequent and severe surges in amperage were experienced. Without removing the heavy serrated cake or changing operation in any other way, hot water was continuously introduced into the jacket at a temperature of about 165° F. and at the rate of 9 gals. per minute. Its return temperature was about 157°, for a calculated heat flow of 33,600 B.t.u. per hour. Within two hours of first application of heat, current flow had dropped to 10 amperes (7.5 H.P.) and remained at that level continuously thereafter with only occasional and minor surges upward. Subsequent inspections revealed that all cake had completely disappeared and from the steady state current flow it was evident that no new cake was being formed.

It is apparent from the foregoing examples and from my experience that the process and apparatus of my invention have not only provided improved pelletizer operation but have also reduced costs of operation by reason of greatly reduced pin wear and lower power requirements. For example, on a single machine power consumption was reduced by 87 kilowatt-hours per day.

I claim:

1. In a process for producing carbon black pellets in continuous generally horizontal flow by agitation thereof in admixture with a liquid in a rotary pin-agitated pelletizer, the improvement which comprises uniformly heating the boundary wall of the agitation zone by means of a circulating hot liquid to a temperature of at least 150° F. at which caking of carbon black on said wall is substantially inhibited and maintaining such temperature at no lower value during agitation of the carbon black.

References Cited

UNITED STATES PATENTS

| | | | |
|---|---|---|---|
| 2,263,118 | 11/1941 | Carney | 23—314 X |
| 2,317,026 | 4/1943 | Brown | 23—314 X |
| 2,642,343 | 6/1953 | Studebaker | 23—313 X |
| 2,751,301 | 6/1956 | Leslie | 23—313 X |
| 2,787,599 | 4/1957 | Belden | 23—269 X |
| 2,890,942 | 6/1959 | Webster | 23—314 |
| 2,900,668 | 8/1959 | Hubner | 23—313 X |
| 2,964,392 | 12/1960 | Drummond | 264—117 X |
| 3,012,874 | 12/1961 | Phillips | 23—313 X |
| 3,032,390 | 5/1962 | Count | 23—313 X |
| 3,206,278 | 9/1965 | Green | 23—313 X |
| 3,330,874 | 7/1967 | Shannon | 23—313 X |
| 3,019,093 | 1/1962 | Gholson | 23—314 |

NORMAN YUDKOFF, Primary Examiner

S. J. EMERY, Assistant Examiner

U.S. Cl. X.R.

264—117